United States Patent
Dobrynin et al.

(10) Patent No.: US 10,008,223 B1
(45) Date of Patent: Jun. 26, 2018

(54) MAGNETORESISTIVE SENSOR WITH RECESSED ANTIFERROMAGNETIC LAYER AND STABILIZATION FEATURE

(71) Applicant: Seagate Technology LLC, Cupertino, CA (US)

(72) Inventors: Alexey Dobrynin, Derry (GB); Zhiran Wang, Derry (GB); Kevin McNeill, Derry (GB); Denis O'Donnell, Derry (GB); Sameh Hassan, Derry (GB); Marcus Ormston, Derry (GB); Robert William Lamberton, Limavady (GB)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/435,561

(22) Filed: Feb. 17, 2017

Related U.S. Application Data

(60) Provisional application No. 62/296,860, filed on Feb. 18, 2016.

(51) Int. Cl.
G11B 5/39 (2006.01)

(52) U.S. Cl.
CPC ............ *G11B 5/3906* (2013.01); *G11B 5/398* (2013.01); *G11B 5/3909* (2013.01); *G11B 5/3932* (2013.01); *G11B 2005/3996* (2013.01)

(58) Field of Classification Search
None
See application file for complete search history.

(56) References Cited

U.S. PATENT DOCUMENTS

| | | | |
|---|---|---|---|
| 6,741,432 B2 | 5/2004 | Pinarbasi |
| 6,842,316 B2 | 1/2005 | Gill |
| 6,970,333 B2 | 11/2005 | Boeve |
| 7,092,221 B2 | 8/2006 | Gill |
| 7,226,796 B2 | 6/2007 | Pietambaram et al. |
| 7,369,371 B2 | 5/2008 | Freitag et al. |
| 7,602,589 B2 | 10/2009 | Freitag et al. |
| 7,684,161 B2 | 3/2010 | Pietambaram et al. |
| 7,961,440 B2 | 6/2011 | Gill et al. |
| 8,068,317 B2 | 11/2011 | Gill |
| 8,711,528 B1 | 4/2014 | Xiao et al. |
| 8,865,326 B2 | 10/2014 | Fukumoto et al. |

(Continued)

*Primary Examiner* — Craig A. Renner
(74) *Attorney, Agent, or Firm* — Westman, Champlin & Koehler, P.A.

(57) ABSTRACT

A read sensor having a bearing surface and an antiferromagnetic (AFM) layer recessed from the bearing surface. The read sensor includes a synthetic antiferromagnetic (SAF) structure over the AFM layer. The SAF structure includes a recessed lower pinned layer, an upper pinned layer, a reference layer and a stabilization feature. The stabilization feature may include deliberate reduction of the antiferromagnetic coupling energy density between the upper pinned layer and the reference layer, so that it becomes lower than the first energy density of antiferromagnetic coupling between the upper pinned layer and the lower pinned layer. The stabilization feature may alternatively include an intermediate pinned layer between the lower pinned layer and the upper pinned layer. The intermediate pinned layer is antiferromagnetically coupled to both the lower pinned layer and the upper pinned layer, and at least a portion of the intermediate pinned layer is recessed behind the bearing surface.

16 Claims, 18 Drawing Sheets

(56) References Cited

U.S. PATENT DOCUMENTS

| | | |
|---|---|---|
| 8,871,365 B2 | 10/2014 | Wang et al. |
| 9,030,785 B2 | 5/2015 | Freitag et al. |
| 9,099,109 B2 | 8/2015 | Dimitrov et al. |
| 9,171,559 B1 * | 10/2015 | Nikolaev et al. .... G11B 5/3929 |
| 9,514,771 B2 * | 12/2016 | Makino et al. ...... G11B 5/3912 |
| 2012/0276415 A1 | 11/2012 | Sapozhnikov et al. |
| 2015/0179195 A1 | 6/2015 | Freitag et al. |

* cited by examiner

SDW (RKKY1= - 0.3 erg/cm$^2$, RKKY2= - 0.8 erg/cm$^2$):

UDW (RKKY1= - 0.8 erg/cm$^2$, RKKY2= - 0.3 erg/cm$^2$):

MAGNETORESISTIVE SENSOR WITH RECESSED ANTIFERROMAGNETIC LAYER AND STABILIZATION FEATURE

CROSS-REFERENCE TO RELATED APPLICATIONS

The present application is based on and claims the benefit of U.S. provisional patent application Ser. No. 62/296,860, filed Feb. 18, 2016, the content of which is hereby incorporated by reference in its entirety.

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor may be employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

With ever-increasing levels of recording density in disc drives and a need for faster data transfer speeds, the read transducer needs to have correspondingly better data-reproducing capabilities.

SUMMARY

A read sensor having a bearing surface and an antiferromagnetic (AFM) layer recessed from the bearing surface is provided. The read sensor includes a synthetic antiferromagnetic (SAF) structure over the AFM layer. The SAF structure includes a lower recessed pinned layer on the AFM layer, and an upper non-recessed pinned layer over the lower pinned layer, which are antiferromagnetically coupled to each other via a non-magnetic metal spacer. A reference non-recessed layer is included above the upper pinned layer, to which it is antiferromagnetically coupled in the same way. The SAF structure also includes a stabilization feature. The stabilization feature may include a variable thickness of the spacer layer, which allows to adjust the RKKY coupling strength between layers in SAF. The stabilization feature may alternatively include an intermediate pinned layer between the lower pinned layer and the upper pinned layer. The intermediate pinned layer is antiferromagnetically coupled to both the lower pinned layer and the upper pinned layer, and at least a portion of the intermediate pinned layer is recessed behind the bearing surface.

Other features and benefits that characterize embodiments of the disclosure will be apparent upon reading the following detailed description and review of the associated drawings.

DETAILED DESCRIPTION OF ILLUSTRATIVE EMBODIMENTS

Magnetic reproducing device embodiments described below relate to a read sensor that employs an antiferromagnetic (AFM) layer that is recessed from a bearing surface of the sensor. The recessed AFM layer pins a magnetization direction of a ferromagnetic layer of a synthetic antiferromagnetic (SAF) structure of the sensor. The read sensor with the recessed AFM layer additionally includes a stabilization feature within the SAF structure. However, prior to providing additional details regarding the different embodiments, a description of an illustrative operating environment is provided below.

Figure 1:
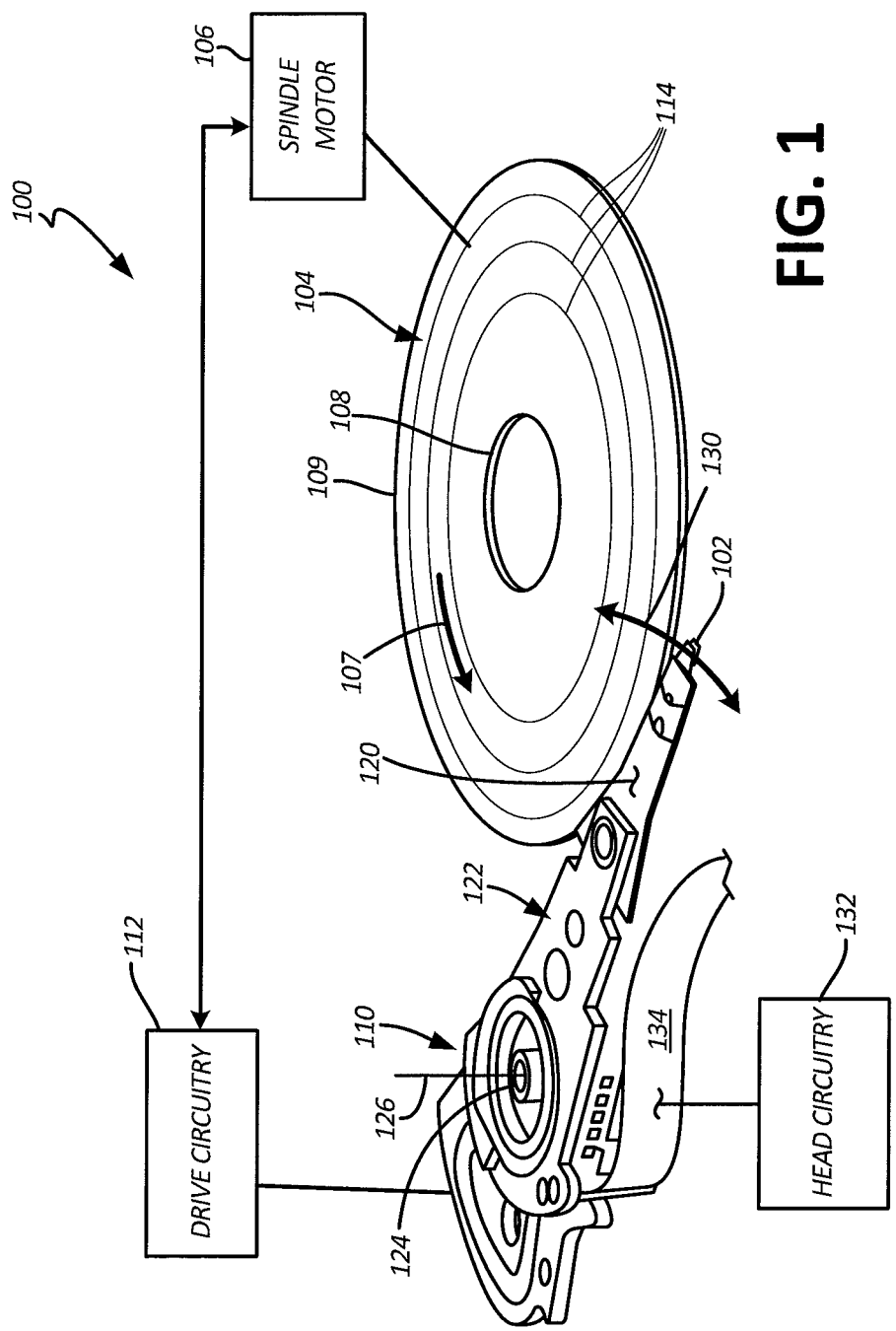
FIG. 1 is a schematic illustration of an example data storage system including a data storage medium and a head for reading data from and/or writing data to the data storage medium.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
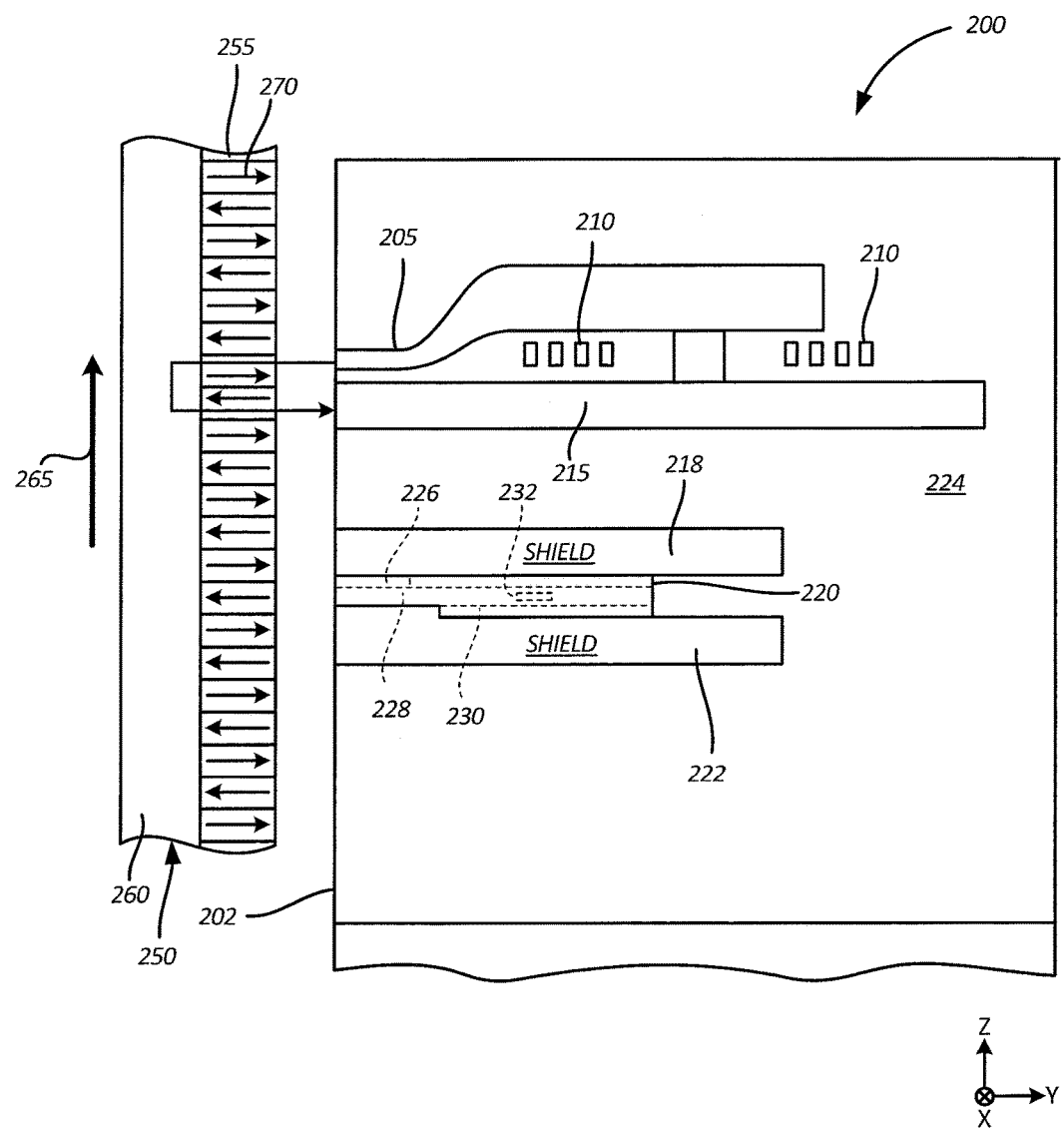
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head, such as recording head 102 in FIG. 1. Medium 250 is illustratively a data storage medium, such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read transducer 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

As will be described further below, read transducer 220 may include a free layer 226, a SAF structure 228 and an AFM layer 230. AFM layer 230 pins a magnetization direction of at least one magnetic layer of the SAF structure 228. As can be seen in FIG. 2, the AFM layer 230 is positioned behind the bearing surface 202 to enable a reduction in spacing between shields 218 and 222. However, for reasons provided further below, including the AFM 230 in the recessed position may result in magnetic stability-related challenges. To address the magnetic-stability related challenges, at least one stabilization feature 232 is included in the SAF structure 228.

In the reader embodiments, layers of read transducer 220 may be stacked along a track direction (i.e., a z-direction in FIG. 2) or a track width direction that is normal to the track direction (i.e., a cross-track direction, which is an x-direction in FIG. 2). A y-direction in FIG. 2 is then defined as a direction that is perpendicular to x and z simultaneously, which is a stripe-height direction. In the embodiment shown in FIG. 2, layers of read transducer 220 may be stacked along the track direction. Different reader embodiments and structural details regarding stabilization features within the different embodiments are described below in connection with FIGS. 3A-12B.

Figure 3A:
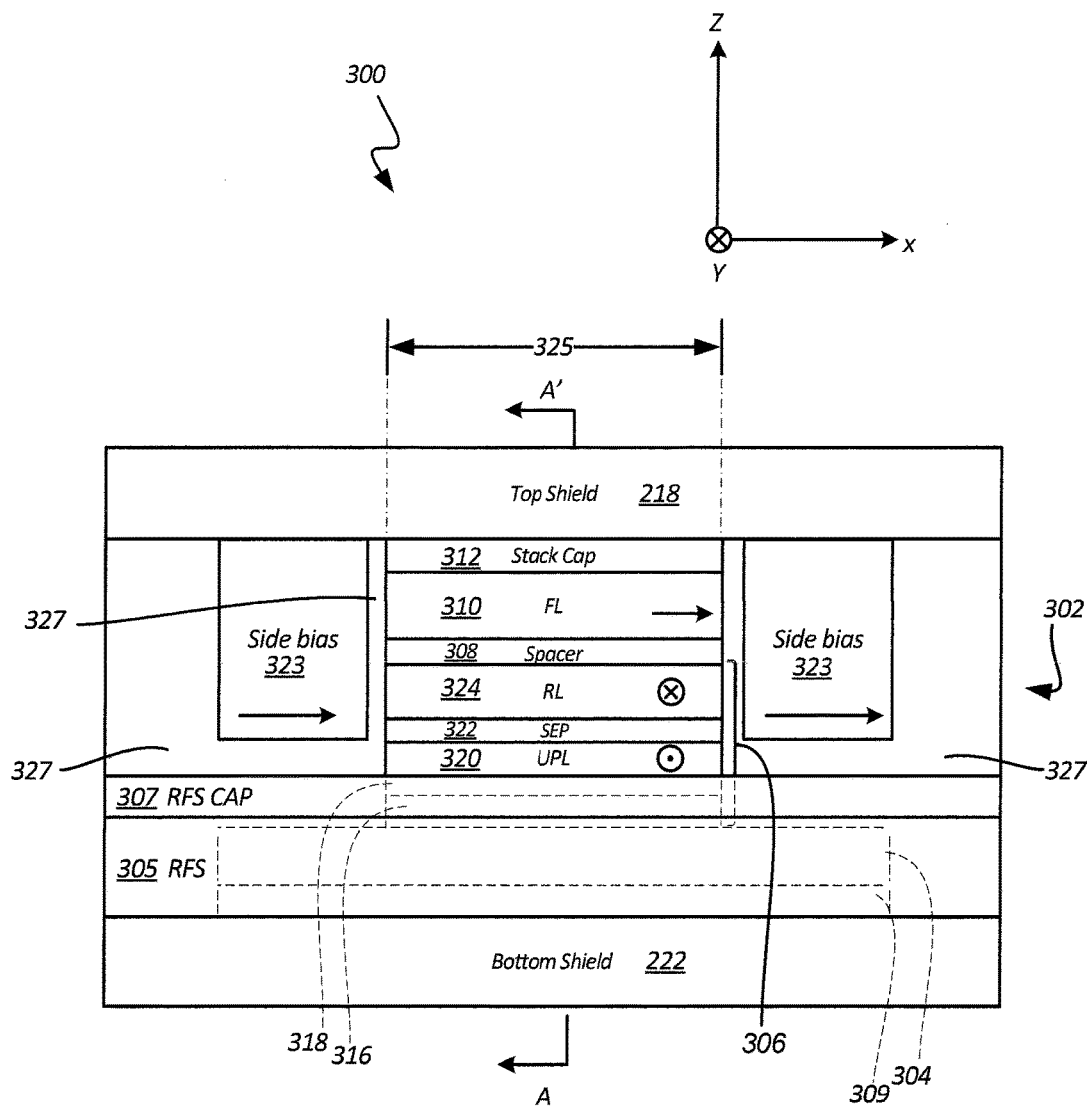
FIG. 3A is a bearing surface view of a first embodiment of a magnetic reproducing device.

FIG. 3A is a bearing surface view of a magnetic reproducing device/reader 300 that includes a magnetoresistive sensor 302 that employs a recessed AFM layer to pin a ferromagnetic layer of a SAF structure of reader 300. Recessed elements including recessed AFM layer 304 of reader 300 are visible in FIG. 3B, which is a cross-sectional view of reader 300 of FIG. 3A through a plane orthogonal to the bearing surface and layers of reader 300 (along line A-A' shown in FIG. 3A). Reader embodiments that employ the recessed AFM layer 304 include one or more stabilization features, which are described in detail further below.

Figure 3B:
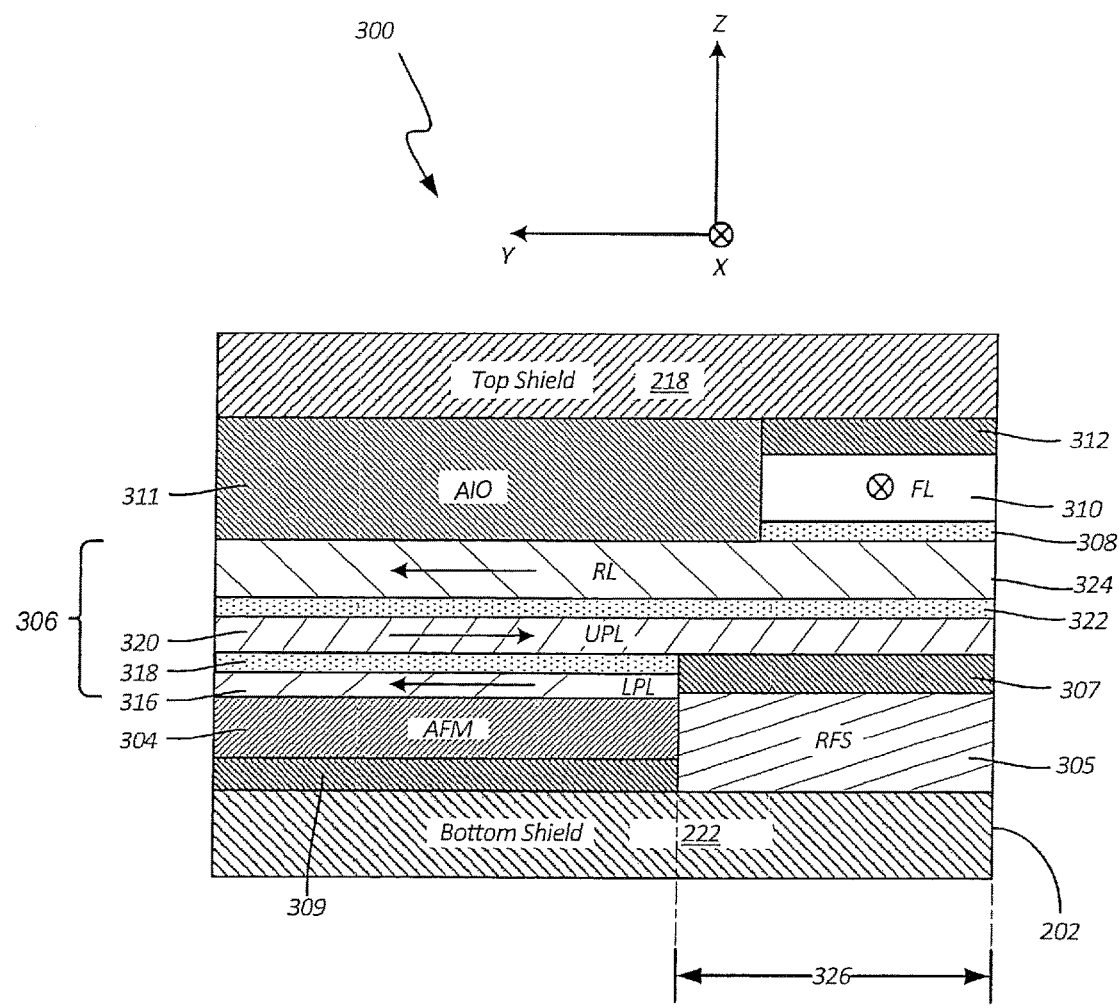
FIG. 3B is a sectional view of the magnetic reproducing device of FIG. 3A.

Referring to FIGS. 3A and 3B, magnetoresistive sensor 302 is positioned between a top shield 218 and a bottom shield 222. Also, a front portion of magnetoresistive sensor 302 is above a reader front shield (RFS) 305 that is positioned in front of recessed AFM layer 304. Top, bottom and front shields 218, 222 and 305, which may be made of a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the shields 218, 222 and 305 permit magnetic fields from the bit directly under magnetoresistive sensor 302 to affect the magnetoresistive sensor 302, and thus be read.

The magnetoresistive sensor 302 includes a plurality of layers including a synthetic antiferromagnetic (SAF) structure 306, a spacer layer 308, a free layer or sensing layer 310 and a stack cap 312. Stack cap 312 may be formed of a non-magnetic layer (for example, a ruthenium (Ru) layer) that has a thickness that is sufficient to magnetically decouple the free layer 310 from the top shield 218. A similar decoupling layer 307 is included between the RFS 305 and the SAF structure 306. A seed layer for AFM 304 is denoted by reference numeral 309.

In general, a SAF structure such as 306 includes two or more ferromagnetic layers separated by a non-magnetic layer, which provides antiparallel coupling between the ferromagnetic layers. Stabilization of magnetic moments of the ferromagnetic layers in the range of interest (for example, magnetic fields generated by the bits of data stored on the data discs) may be carried out by "pinning" one of the ferromagnetic layers on an outside surface with an AFM layer. As noted above, a recessed AFM layer 304 (shown in FIG. 3B) is employed to pin SAF structure 306.

In magnetoresistive sensor 302, the SAF structure 306 includes a lower pinned layer 316, a lower separation layer 318, an upper pinned layer 320, an upper separation layer 322 and a reference layer 324. Layers 316, 320 and 324 are ferromagnetic layers, and each of layers 318 and 322 is a thin non-magnetic layer that may comprise a metal such as Ru in some embodiments. The lower pinned layer 316 and the upper pinned layer 320 are antiferromagnetically coupled through lower separation layer 318 via Ruderman-Kittel-Kasuya-Yosida (RKKY) exchange interaction. Similarly, the upper pinned layer 320 and the reference layer 324 are antiferromagnetically coupled through upper separation layer 322 via RKKY exchange interaction. The magnetic moments of layers 316, 320 and 324 are generally oriented normal to the plane (i.e., the y direction) of FIG. 3A. The upper pinned layer 320 has its magnetic moment generally oriented anti-parallel to the magnetic moment of the lower pinned layer 316. Also, the reference layer 324 has its magnetic moment generally oriented anti-parallel to the magnetic moment of the upper pinned layer 320. In accordance with one embodiment, in order to provide magnetic stability in the range of interest, an RKKY coupling strength or antiferromagnetic coupling energy density between the upper pinned layer 320 and the reference layer 324 (RKKY2) is made different from an RKKY coupling strength between the lower pinned layer 316 and the upper pinned layer 320 (RKKY1). Details regarding the optimization of RKKY coupling strengths are provided further below.

In the embodiment shown in FIGS. 3A and 3B, the magnetic moment of the free layer 310 is free to rotate under the influence of an applied magnetic field in a range of interest. The read head 300 further includes side biasing magnets or side shields 323, which produce a magnetic field that biases the free layer 310 with a magnetic moment parallel to the plane of the figure and generally oriented horizontally. This bias prevents the magnetic moment of the free layer 310 from drifting due to, for example, thermal energy, which may introduce noise into the data sensed by the read head 300. The bias is sufficiently small, however, that the magnetic moment of the free layer 310 can change in response to an applied magnetic field, such as a magnetic field of a data bit stored on the data discs. The magnetoresistive sensor 302 is separated and electrically isolated from the side biasing magnets 323 by an isolation layer 327 including, for example, insulating materials. Isolation layer 327 may also be present in other regions of head 300 as shown in FIG. 3A. Isolation layer 327 is also included in the embodiments of FIGS. 7A, 11A and 12A. Isolation layers (e.g., AlO 311) may also be included behind free layer 310 in the embodiments of FIGS. 3B, 7B, 11B and 12B.

In some embodiments, sensor 302 may utilize tunnel magnetoresistance (TMR) or giant magnetoresistance (GMR) effects. In embodiments that utilize TMR effects, spacer layer 308 is a tunneling barrier layer that separates the SAF structure 306 from the free layer 310. The tunneling barrier layer 308 is sufficiently thin that quantum mechanical electron tunneling occurs between a reference layer 320 in the SAF structure 306 and the free layer 310. The electron tunneling is electron-spin dependent, making the magnetic response of the magnetoresistive sensor 302 a function of the relative orientations and spin polarizations of the SAF structure 306 and the free layer 310. The highest probability of electron tunneling occurs when the magnetic moments of the SAF structure 306 and the free layer 310 are parallel, and the lowest probability of electron tunneling occurs when the magnetic moments of the SAF structure 306 and the free layer 310 are antiparallel. Accordingly, the electrical resistance of the magnetoresistive sensor 302 changes in response to an applied magnetic field. The data bits on the data discs in the disc drive may be magnetized in a direction normal to the plane of FIG. 3A, either into the plane of the figure, or out of the plane of the figure. Thus, when the magnetoresistive sensor 302 passes over a data bit, the magnetic moment of the free layer 310 is rotated either into the plane of FIG. 3A or out of the plane of FIG. 3A, changing the electrical resistance of the magnetoresistive sensor 302. The value of the bit being sensed by the magnetoresistive sensor 302 (for example, either 1 or 0) may therefore be determined based on the current flowing from a first electrode (not shown) to a second electrode (not shown) connected to the magnetoresistive sensor 302.

As indicated earlier, stability in a reader that employs a recessed AFM layer may be worse than that of a reader with a non-recessed AFM layer (i.e., an AFM layer with an end flush with bearing surface 202). This is due to domain wall (DW) formation in the non-recessed part of SAF after the reader with the recessed AFM layer is subjected to certain treatment; for example, magnetically saturating the head including the reader in a direction perpendicular to the bearing surface. In recessed AFM reader embodiments that include the same number of SAF layers as those shown in FIGS. 3A and 3B and have substantially equal RKKY1 and RKKY2 values of about −0.8 erg/cm$^2$, magnetic instability may occur after saturation in a magnetic field directed at the ABS. It should be noted that −0.8 erg/cm$^2$ is the RKKY value extracted by fitting experimental magnetization curves, and that RKKY value is obtained when a Ru layer having a thickness of 0.84 nm is used as a separation layer between two ferromagnetic layers of the SAF.

To address magnetic instability, micromagnetic modelling of the reader design shown in FIGS. 3A and 3B was performed for a range of RKKY coupling strengths. The recession length (i.e., distance of the AFM layer 304 behind the bearing surface denoted by reference numeral 326) was set substantially high (60 nm) to prevent thermal noise from the AFM from being propagated to the free layer 310, which was set to be 35 nm wide. The width of the free layer 310 is denoted be reference numeral 325 in FIG. 3A. The gap between the RFS 305 and the upper pinned layer 320 was filled with a 4 nm thick Ru layer to prevent any exchange coupling between those two layers.

Figure 4A:
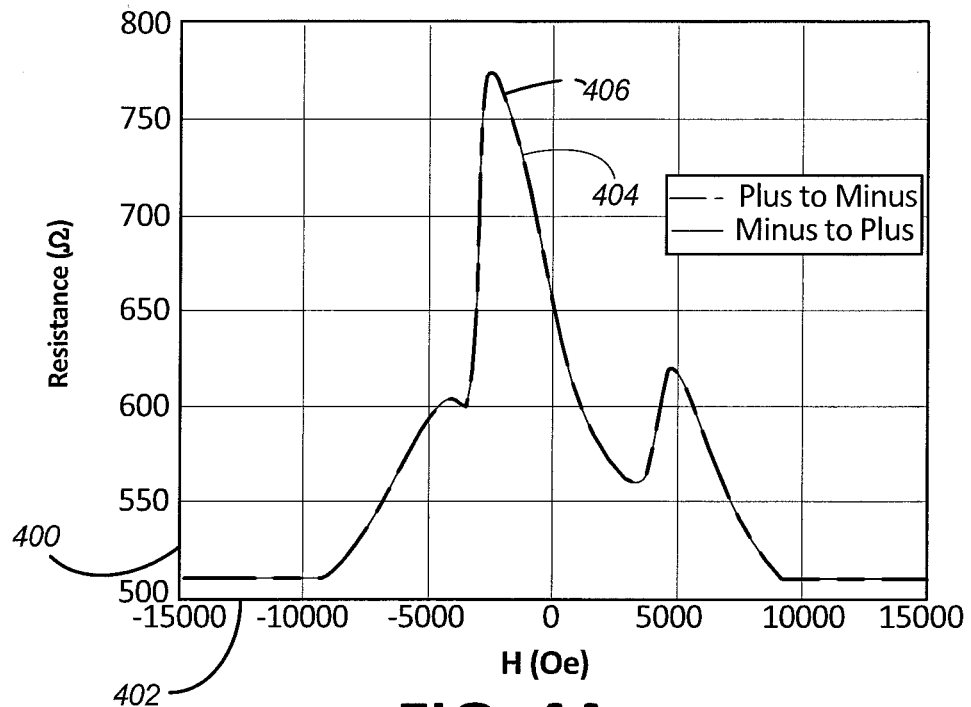
FIGS. 4A, 4B and 4C are graphs including high field transfer curves showing different domain states.
Figure 4B:
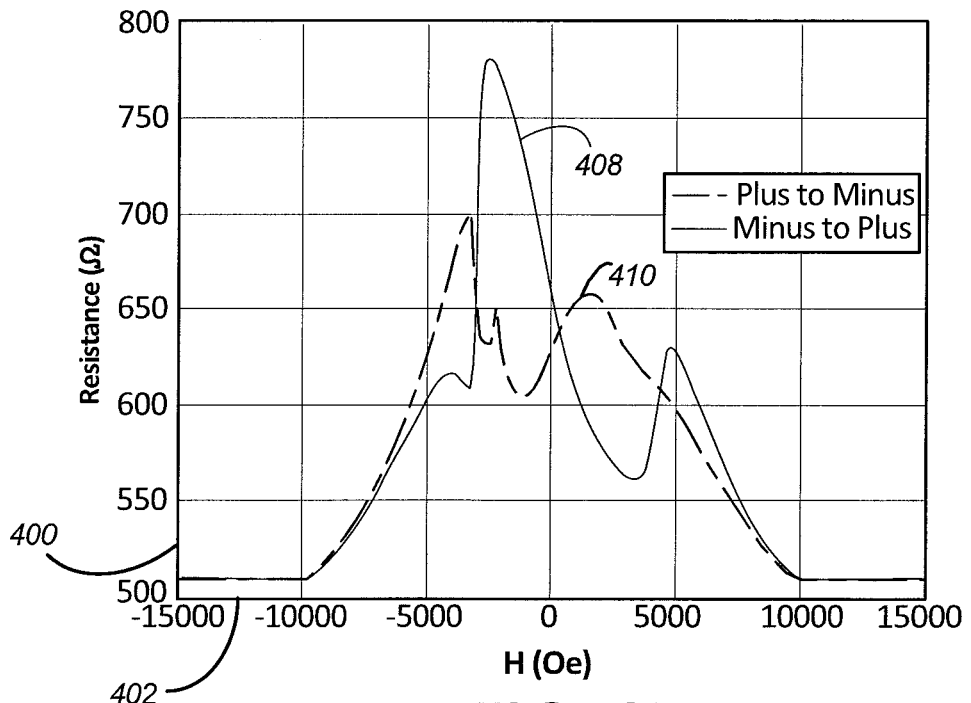
Figure 4C:
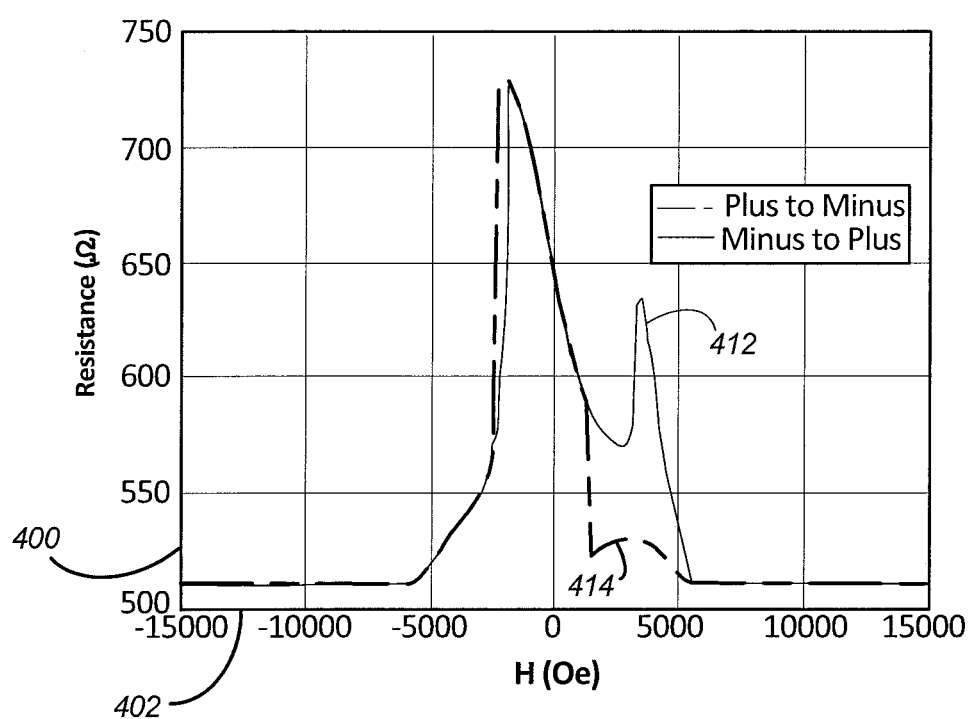
Figure 5A:
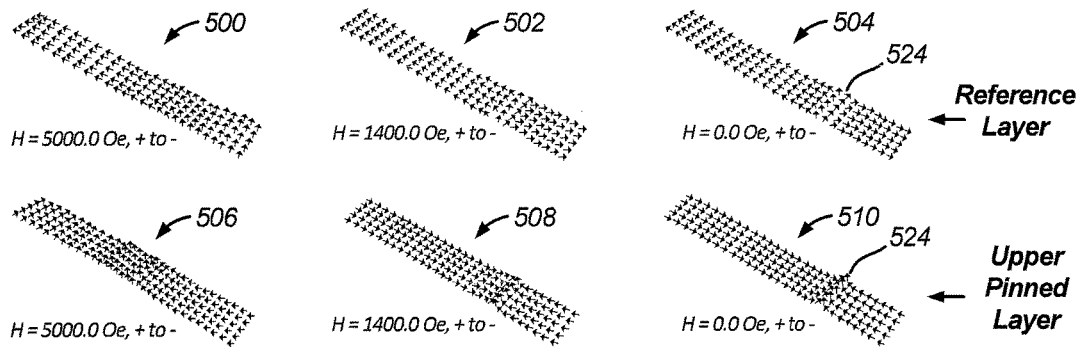
FIGS. 5A and 5B are diagrammatic illustrations showing magnetic profiles of a reference layer and an upper pinned layer for different domain states.
Figure 5B:
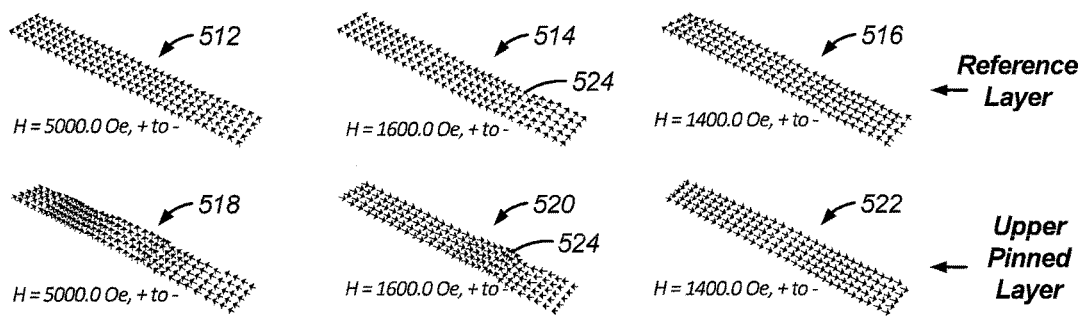

It was found that three states may occur in such a system: "No Domain Wall" (NDW), when no domain wall develops in the SAF structure and there is no polarity reversal; "Stable Domain Wall" (SDW), when a DW in the upper pinned layer/the reference layer develops over the recessed portion (i.e., above the recessed AFM) after saturation in a positive (i.e., into the bearing surface) field; and "Unstable Domain Wall" (UDW), when a DW in the upper pinned layer/the reference layer appears above the recessed portion after saturation in the positive field, but is expelled in positive fields when the field magnitude after saturation is reduced. FIGS. 4A, 4B and 4C show high field transfer curves for these three states. In each of the FIGS. 4A, 4B and 4C, a vertical axis 400 represents resistance in ohms and a horizontal axis 402 represents an applied magnetic field (H) in Oersted (Oe). In FIGS. 4A, 4B and 4C, solid lines are used for curves 404, 408 and 412 that represent results obtained for different H values incremented in a minus-to-plus direction, and dashed lines are used for curves 406, 410 and 414 that represent results obtained for different H values applied in a plus-to-minus direction. In FIG. 4A, which shows the NDW state, curves 404 and 406 correspond in shape and overlap over the entire range of H values. In FIG. 4B, which shows the SDW state, curves 408 and 410 do not correspond in shape and curve 410 shows substantial irregularities. In FIG. 4C, which shows the UDW state, there is substantial correspondence between curves 412 and 414 and therefore the UDW state may be utilized for designing a SAF structure that is stable in an operating range. Details regarding designing such a SAF structure are provided below in connection with FIGS. 4A-4C and FIGS. 5A and 5B, which are diagrammatic illustrations showing magnetic profiles (i.e., directions of magnetic vector fields) of the reference layer and the upper pinned layer for SDW and UDW states, respectively. For the SDW state (FIG. 5A), RKKY1 is −0.3 erg/cm$^2$ and RKKY2 is −0.8 erg/cm$^2$. For the UDW state (FIG. 5B), RKKY1 is −0.8 erg/cm$^2$ and RKKY2 is −0.3 erg/cm$^2$. In each of FIGS. 5A and 5B, the upper row depicts magnetic profiles of the reference layer under three different H magnitudes and the lower row depicts magnetic profiles of the upper pinned layer under three different H magnitudes. In FIG. 5A, the magnetic profiles of the reference layer are denoted by reference numerals 500, 502 and 504 and the magnetic profiles of the upper pinned layer are denoted by reference numerals 506, 508 and 510. In FIG. 5B, the magnetic profiles of the reference layer are denoted by reference numerals 512, 514 and 516 and the magnetic profiles of the upper pinned layer are denoted by reference numerals 518, 520 and 522. A right side of each of magnetic profiles 500-522 in FIGS. 5A and 5B is a bearing surface side.

A DW appears in a SAF structure when two separate nucleation events occur in the reference layer and in the upper pinned layer at opposite ends of the structure along the y direction (i.e., perpendicular to the bearing surface). When the structure is saturated in the positive direction (i.e., opposite to the nominal orientation of magnetization of the upper pinned layer), and the field magnitude is reduced, nucleation in the upper pinned layer occurs at a side that is opposite from the bearing surface side due to the structure having two antiferromagnetically coupled interfaces. At the same time, in part due to stray fields from the RFS and the free layer, nucleation occurs in the reference layer on top of the recessed portion. When the RKKY2 coupling is strong enough, this leads to fast propagation of this reversed region in the reference layer on top of the recessed portion, which is then met by a propagated reversed region in the upper pinned layer from the opposite end, thus forming a DW 524 shown in FIGS. 5A and 5B. When RKKY2 is weak, reversal in the reference layer on top of the recessed portion occurs slower than reversal in the upper pinned layer, and by the time the reversal front in the upper pinned layer reaches the recessed portion, the reference layer is not yet completely reversed. This is why such a DW is less stable than that in the case of strong RKKY2 coupling, and it can be expelled in positive fields. As can be seen in FIG. 5B, domain wall 524 that may be present when H=1600 Oe is expelled at H=1400 Oe as indicated in magnetic profiles 516 and 522, which include no domain wall.

Accordingly, from FIGS. 4A-4C and FIGS. 5A and 5B it is seen that if the field at which the DW is expelled is large enough, the transfer curve in the working field range in the UDW state is as good as that in the NDW state, and it does not depend on the magnetic history. Therefore, when it is not possible to operate in the NDW state or mode, the RKKY coupling strength can be adjusted such that the system/structure is in the UDW region, and the DW expel field is high.

Figure 6:
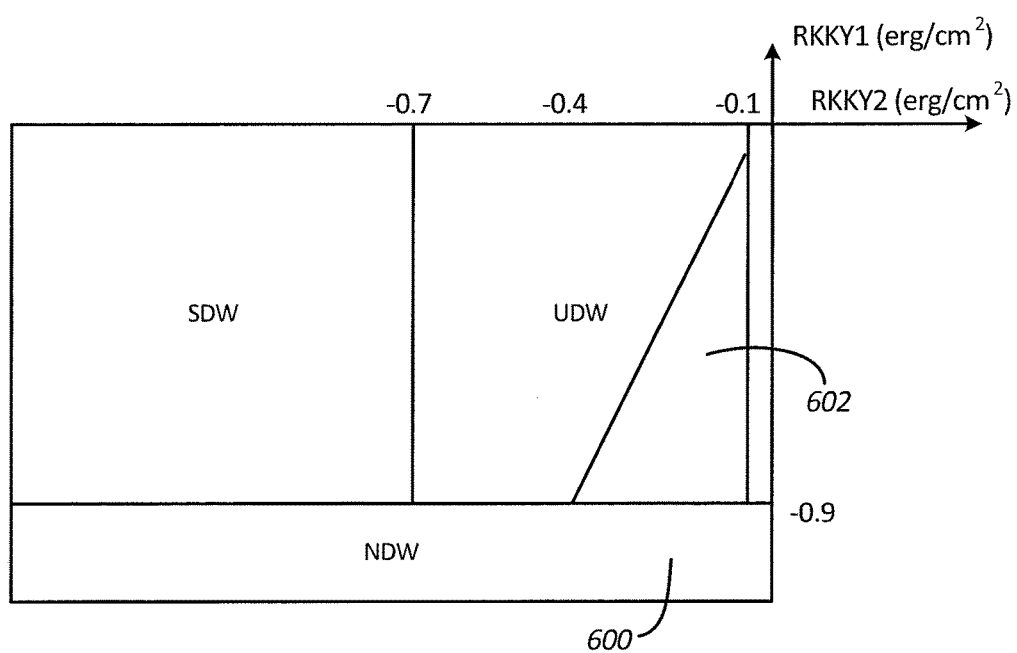
FIG. 6 is a phase diagram of domain states associated with a synthetic antiferromagnetic (SAF) structure with three ferromagnetic layers.

FIG. 6 is a phase diagram obtained from results of systematic micromagnetic modelling of a SAF structure with three ferromagnetic layers (of the type shown in FIGS. 3A and 3B) with various RKKY1 and RKKY2 values. In this example model, a recession length is 60 nm, an exchange bias energy density is −0.5 erg/cm$^2$, a saturation magnetization (Ms) of each of the lower pinned layer, the upper pinned layer and the reference layer is 1000 electromagnetic units (emu)/cm$^3$, the Ms of the free layer is 900 emu/cm$^3$ and the Ms of the shields is 800 emu/cm$^3$. In FIG. 6, it is seen that if RKKY1 magnitude is not high enough (0.9 erg/cm$^2$ in this case), the NDW state (bottom rectangle 600 in FIG. 6) is not reachable. If a maximum achievable RKKY coupling strength in case of a Ru spacer is 0.8 erg/cm$^2$, as experimental results suggest, the NDW is not reachable. However, a deliberate reduction of RKKY2 by using first or third rather than a second antiferromagnetic RKKY coupling peak, while keeping RKKY1 at the second antiferromagnetic coupling peak, will bring the system into triangular region 602 of the phase diagram shown in FIG. 6. Area 602 represents the region for which the DW expel field is larger than the working field magnitude (1.5 kOe in the present case), and therefore the reader is stable in the operational field region. No notable change in MT10 (distance between two positions on the data storage medium at which the signal strength decreases to 10% of its maximum) and PW50 (a width of a read pulse at 50% of its peak amplitude) was found for different RKKY coupling strengths, while asymmetry in an embodiment that utilizes weak RKKY2 is 20% better than embodiments that employ RKKY2 values substantially equal to the limit for strong coupling.

Figure 7A:
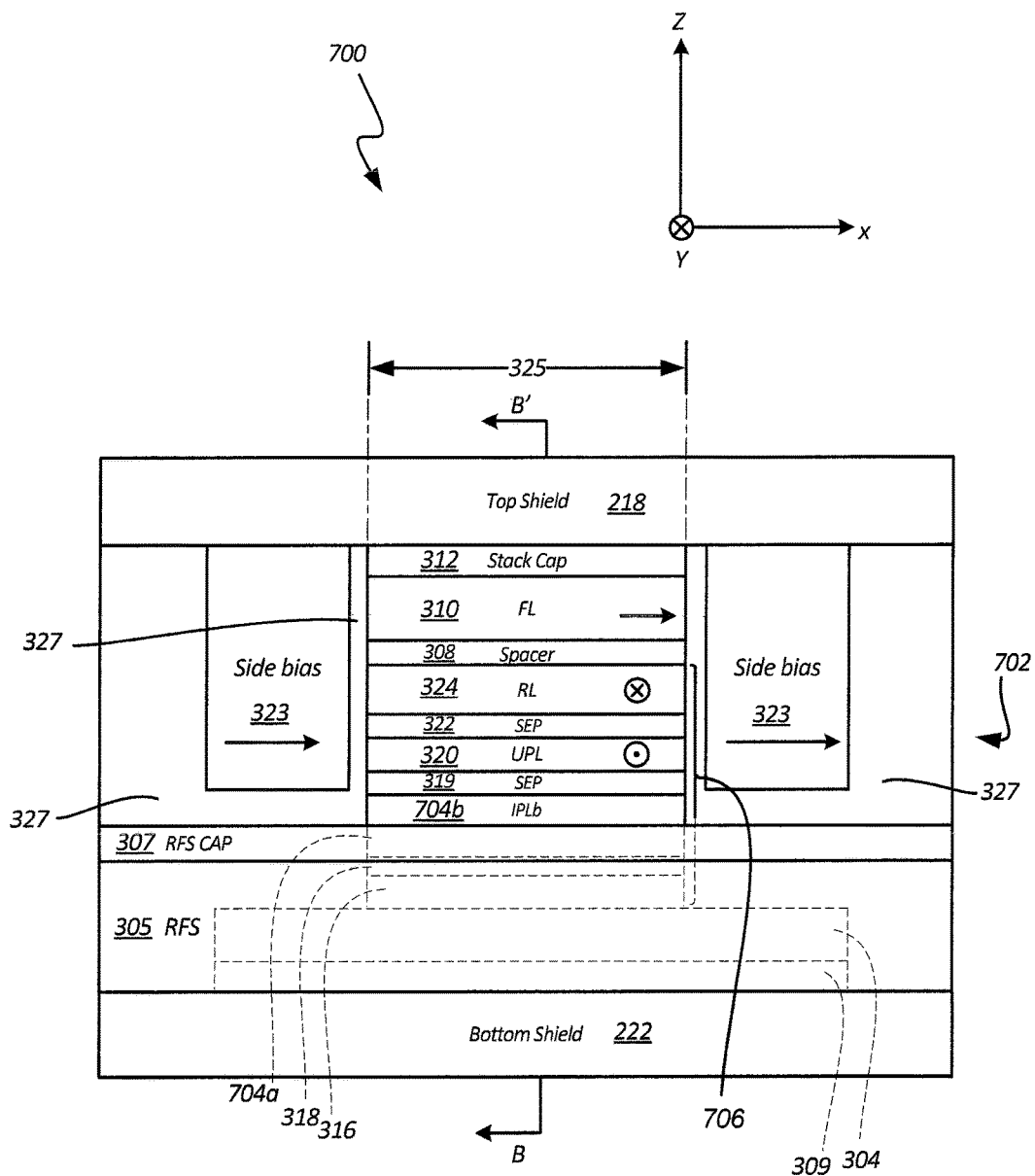
FIG. 7A is a bearing surface view of a second embodiment of a magnetic reproducing device.

FIG. 7A is a bearing surface view of a magnetic reproducing device/reader 700 that includes a magnetoresistive sensor 702 that employs a recessed AFM layer to pin a ferromagnetic layer of a SAF structure of reader 700. Recessed elements including recessed AFM layer 304 of reader 700 are visible in FIG. 7B, which is a cross-sectional view of reader 700 of FIG. 7A through a plane orthogonal to the bearing surface and layers of reader 700 (along line B-B' shown in FIG. 7A). To address domain wall formation that may take place in a SAF structure with three ferromagnetic layers, reader 700 employs an additional ferromagnetic layer in the SAF structure 706. The additional ferromagnetic layer, which constitutes the stabilization feature, is described below. It should be noted that, other than employing the additional ferromagnetic layer in the SAF structure 706 and an additional or intermediate separation layer 319, reader 700 employs layers that are similar to those in reader 300. Thus, a description of the similar elements is not repeated.

Figure 7B:
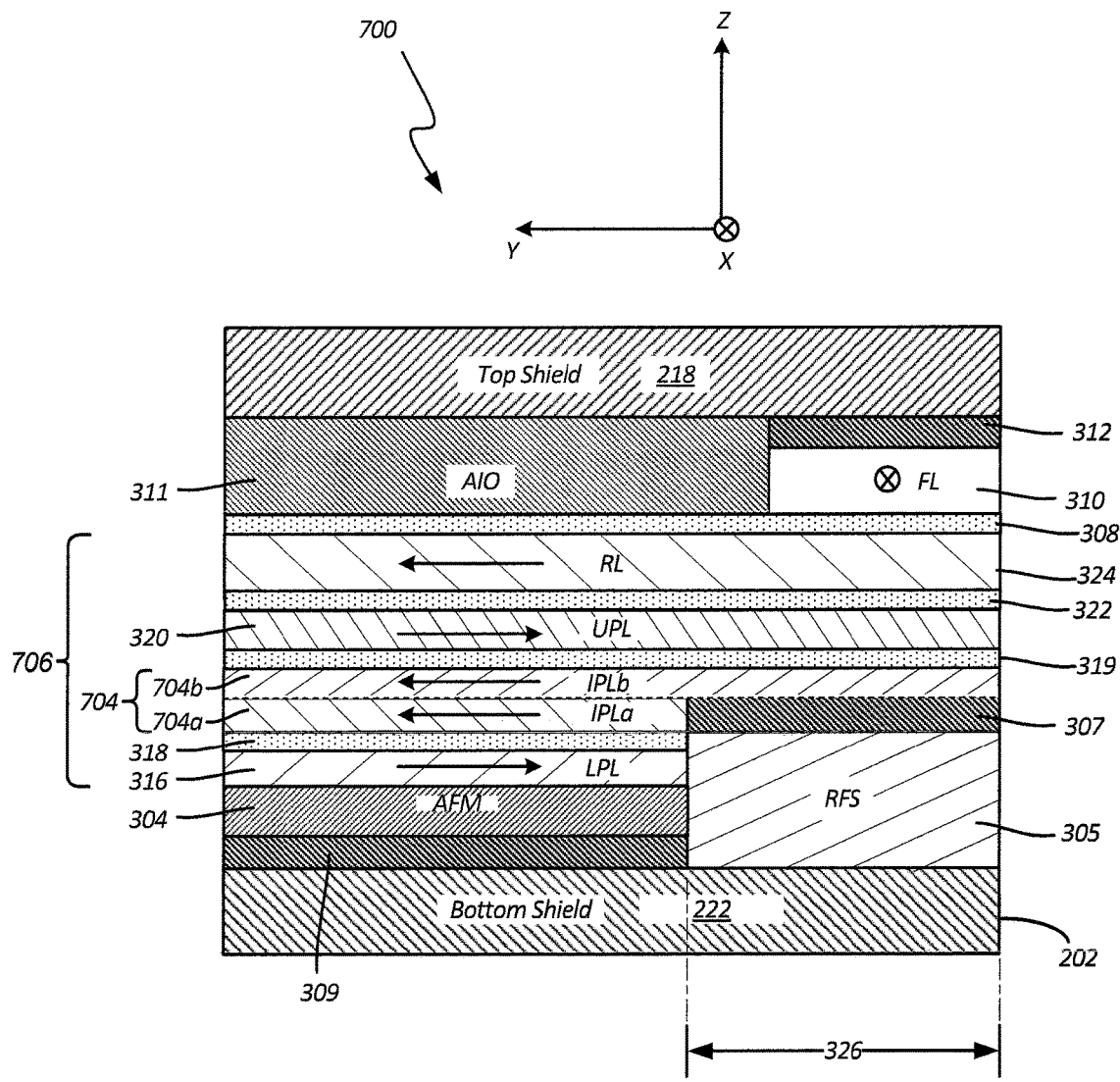
FIG. 7B is a sectional view of the magnetic reproducing device of FIG. 7A.

As can be seen in FIGS. 7A and 7B, the additional pinned layer or intermediate pinned layer, which is denoted by reference numeral 704, is positioned between lower pinned layer 316 and upper pinned layer 320. In reader 700, intermediate pinned layer 704 is a bi-layered structure including a lower recessed layer/portion 704a and an upper non-recessed layer/portion 704b. Lower recessed layer 704a and upper non-recessed layer 704b are ferromagnetically coupled, while the remailing magnetic layers in SAF structure 706 are antiferromagnetically coupled.

One fabrication method for forming reader 700 may include depositing a relatively thick (for example, 5 nm) non-magnetic layer (for example, a Ru layer) on top of lower recessed layer 704a. The method may further include forming an independent capping layer (for example, a Ru layer) on top of RFS 305. Both the Ru layers may then be etched simultaneously using any suitable technique to eliminate Ru from the top of lower recessed layer 704a and retain a 4 nm Ru cap 307 on top of RFS 305. The etch-back region, which is the dividing line between layers 704a and 704b and between layers 307 and 704b is shown as a dashed line in FIG. 7B. The dashed line is indicative of a plane that includes the surface on which layer 704b, is deposited. The recession length (i.e., distance of the AFM layer 304/lower recessed layer 704a form the bearing surface) may be about 60 nm, and the free layer 310 may be 35 nm wide.

Figure 8A:
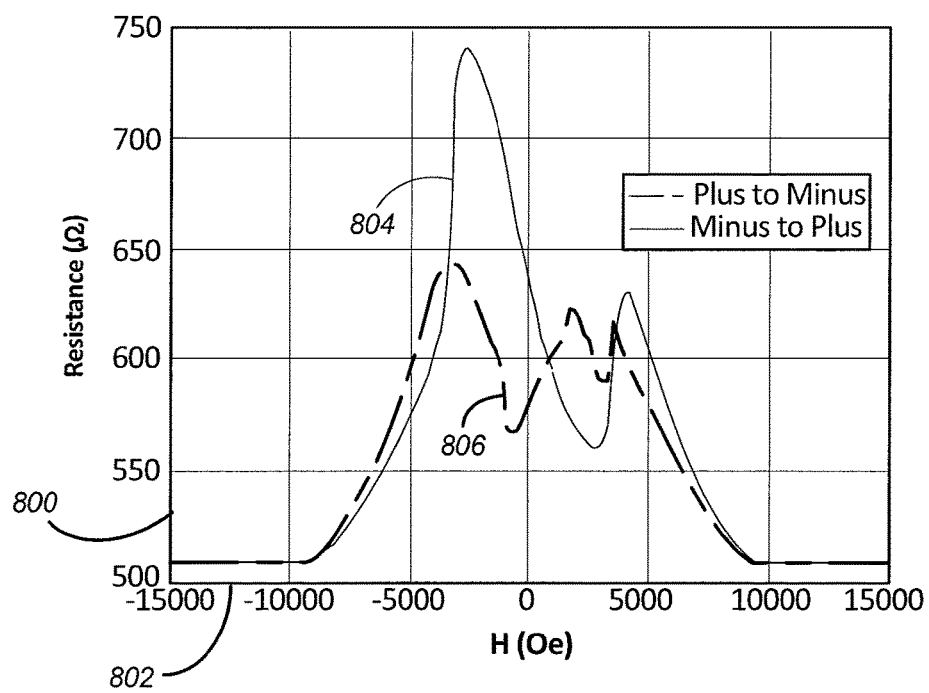
FIGS. 8A and 8B illustrate modelled high field transfer curves for different reader designs.
Figure 8B:
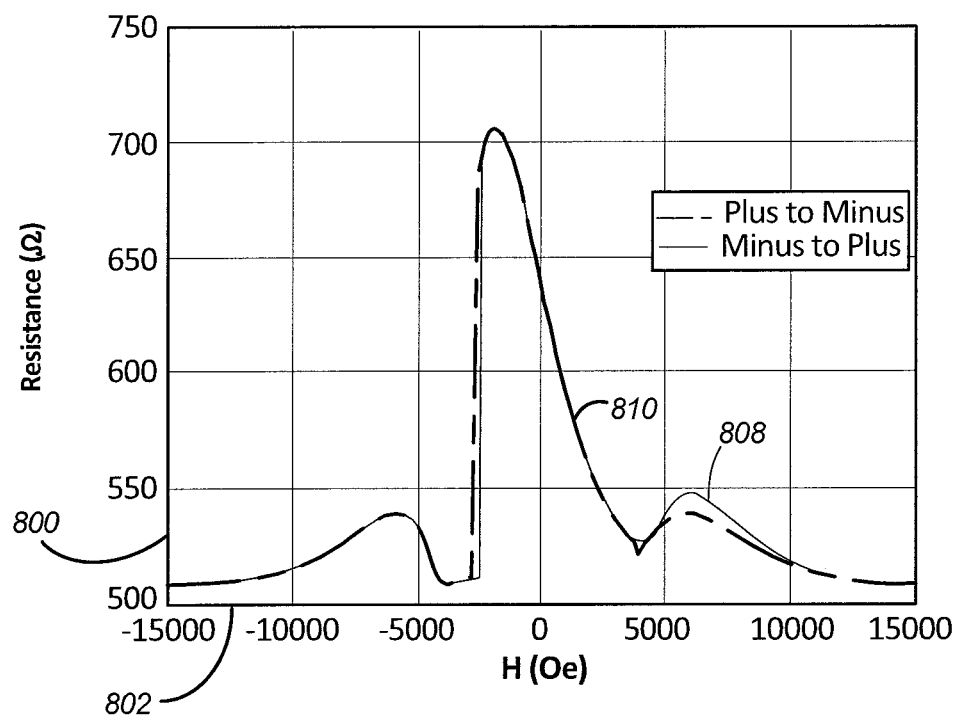

FIGS. 8A and 8B collectively illustrate a comparison between modelled high field transfer curves for a baseline reader design (i.e., a reader having a SAF structure with three ferromagnetic layers, a recession length of 60 nm and RKKY coupling constants between all ferromagnetic layers in the SAF structure equal to −0.8 erg/cm$^2$) and a new reader design of the type shown in FIGS. 7A and 7B (i.e., a reader design having a SAF structure with four ferromagnetic layers, a recession length of 60 nm and RKKY coupling constants between layers in the SAF equal to −8 erg/cm$^2$). In each of the FIGS. 8A and 8B, a vertical axis 800 represents resistance in ohms and a horizontal axis 802 represents an applied magnetic field (H) in Oersted (Oe). In FIGS. 8A and 8B, solid lines are used for curves 804 and 808 that represent results obtained for different H values incremented in a minus-to-plus direction, and dashed lines are used for curves 806 and 810 that represent results obtained for different H values applied in a plus-to-minus direction. In FIG. 8A, which is for the baseline reader design, curves 804 and 806 do not correspond in shape and curve 806 shows substantial irregularities in the working field range after saturating the reader into the bearing surface direction. As described earlier in connection with FIG. 4B, the DW formed in this case is stable, and it can only be expelled by saturation in the negative field or by thermal/mechanical stress. The DW is formed due to nucleation in the reference layer on top of the recessed portion (i.e., above the recessed AFM), followed by nucleation in the underlying upper pinned layer at the opposite end. In contrast, in FIG. 8B, there is substantial correspondence between curves 808 and 810, which demonstrates adequate stability and independence on the magnetic history in the working field range for the new design (i.e., the embodiment of FIGS. 7A and 7B). This is because the addition of the intermediate pinned layer changes the energy balance in the SAF structure and therefore the DW does not appear.

Figure 9A:
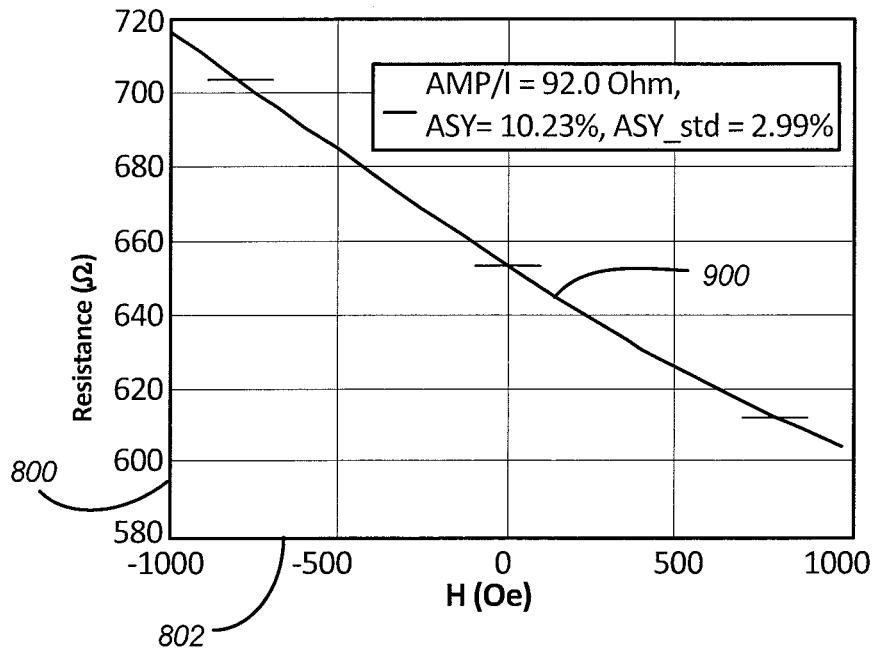
FIGS. 9A and 9B illustrate low field transfer curves for different reader designs.
Figure 9B:
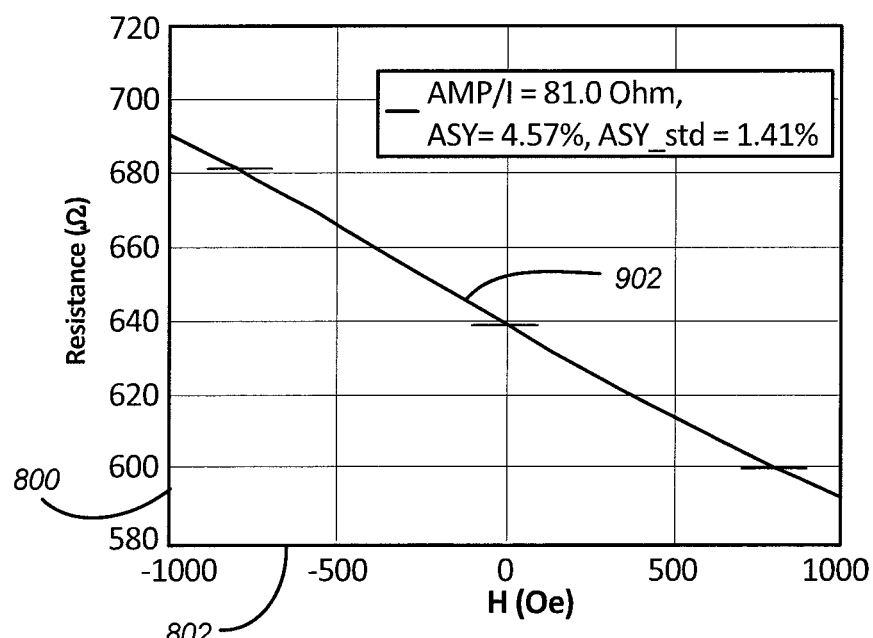

FIGS. 9A and 9B collectively illustrate a comparison between modelled low field transfer curves for the baseline reader design (i.e., the reader having a SAF structure with three ferromagnetic layers, the recession length of 60 nm and the RKKY coupling constants between all ferromagnetic layers in the SAF structure equal to −0.8 erg/cm$^2$) and the new reader design of the type shown in FIGS. 7A and 7B (i.e., the reader design having a SAF structure with four ferromagnetic layers, the recession length of 60 nm and the RKKY coupling constants between layers in the SAF equal to −8 erg/cm$^2$). The low field transfer curves in FIGS. 9A and 9B are denoted by reference numerals 900 and 902, respectively. The low field transfer curves such as 900 and 902 are utilized to calculate reader response parameters such as amplitude and symmetry (equivalence in reader response to both binary polarities (0 and 1)), which help determine reader quality. From curve 900, asymmetry (ASY) for the baseline reader design is 10.2 percent (%). From curve 902, asymmetry of the new reader design is 4.6%, which is a gain in asymmetry of over 100 percent. There is a 12% reduction in the amplitude for the new reader design as compared to the baseline design.

Figure 10A:
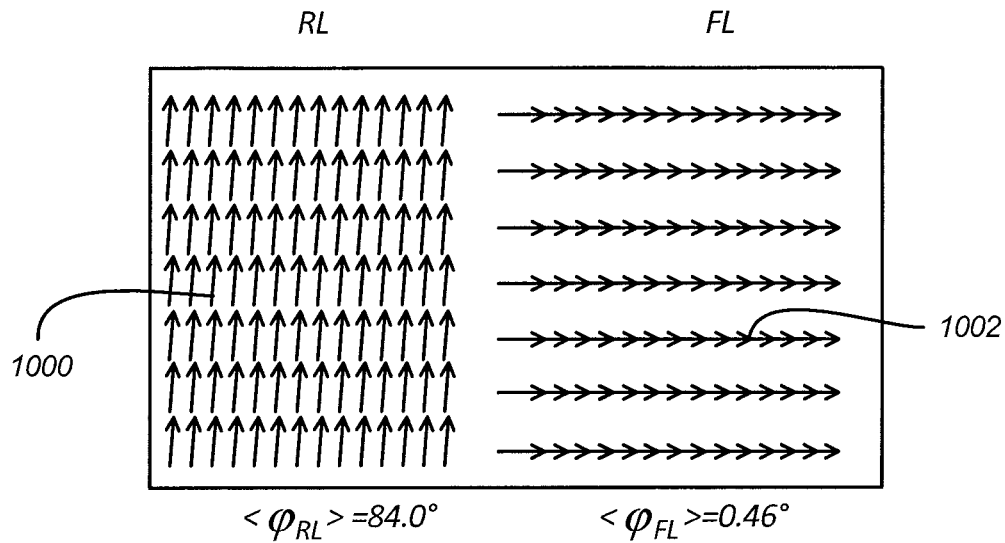
FIGS. 10A and 10B illustrate a comparison between modelled magnetization configurations of a reference layer and a free layer at the MgO barrier for different reader designs.
Figure 10B:
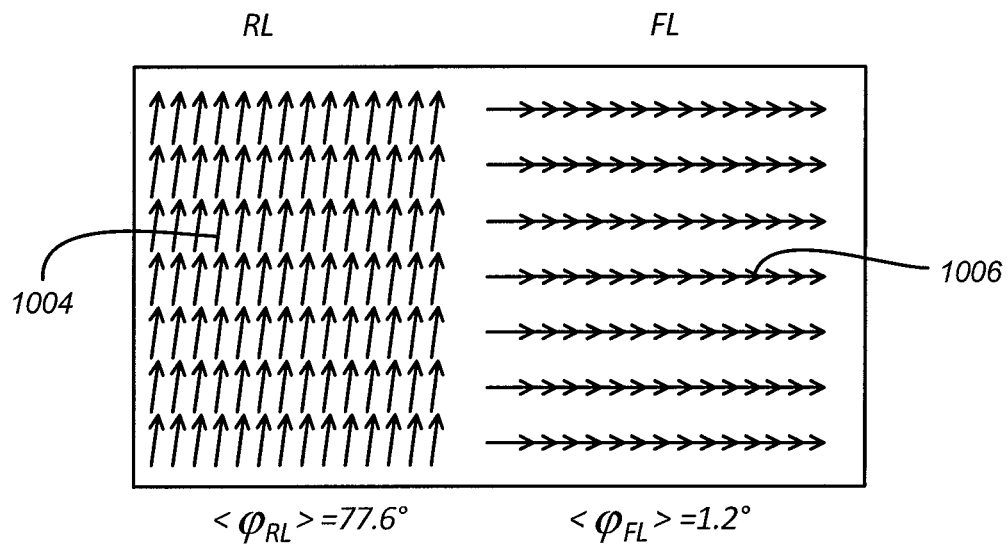

FIGS. 10A and 10B collectively illustrate a comparison between modelled magnetization configurations of the reference layer (RL) and the free layer (FL) at the tunnel barrier at zero applied field for the baseline reader design (FIG. 10A) and the new reader design (FIG. 10B). An azimuthal angle $\varphi$ ($\varphi_{FL}$ and $\varphi_{RL}$) included at the bottom of FIGS. 10A and 10B is defined as an angle between an average magnetization vector of a selected region and the x axis (cross-track direction). In FIG. 10A, RL magnetization vectors are denoted by reference numeral 1000 and FL magnetization vectors are denoted by reference numeral 1002. In FIG. 10B, RL magnetization vectors are denoted by reference numeral 1004 and FL magnetization vectors are denoted by reference number 1006. A comparison of FIGS. 10A and 10B indicates that the average angle between the RL and FL magnetization vectors is smaller in case of the new reader design. This reduced/more acute angle between RL and FL in the new reader design helps reduce the asymmetry to 4.2% in this design.

Figure 11A:
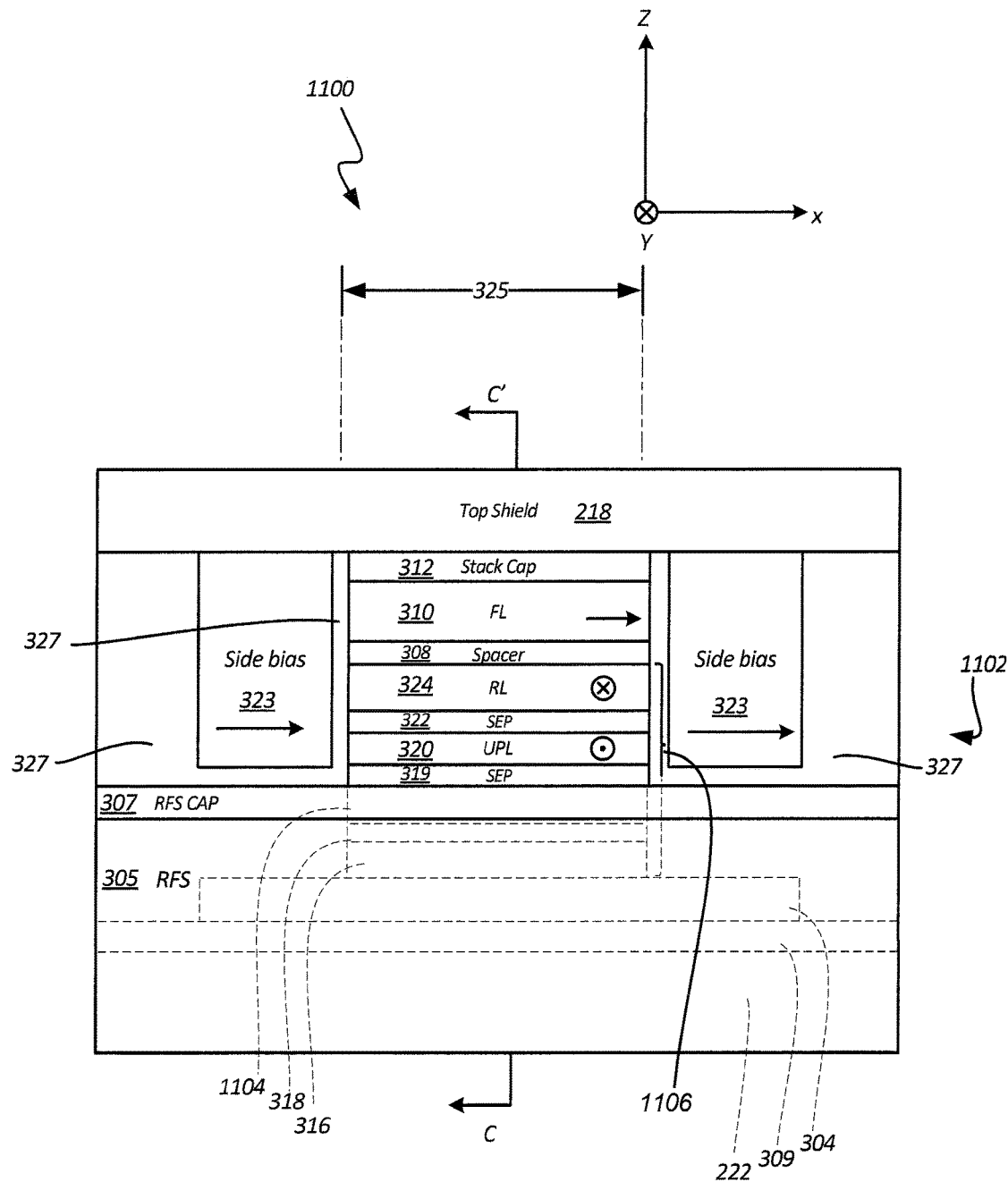
FIG. 11A is a bearing surface view of a third embodiment of a magnetic reproducing device.
Figure 11B:
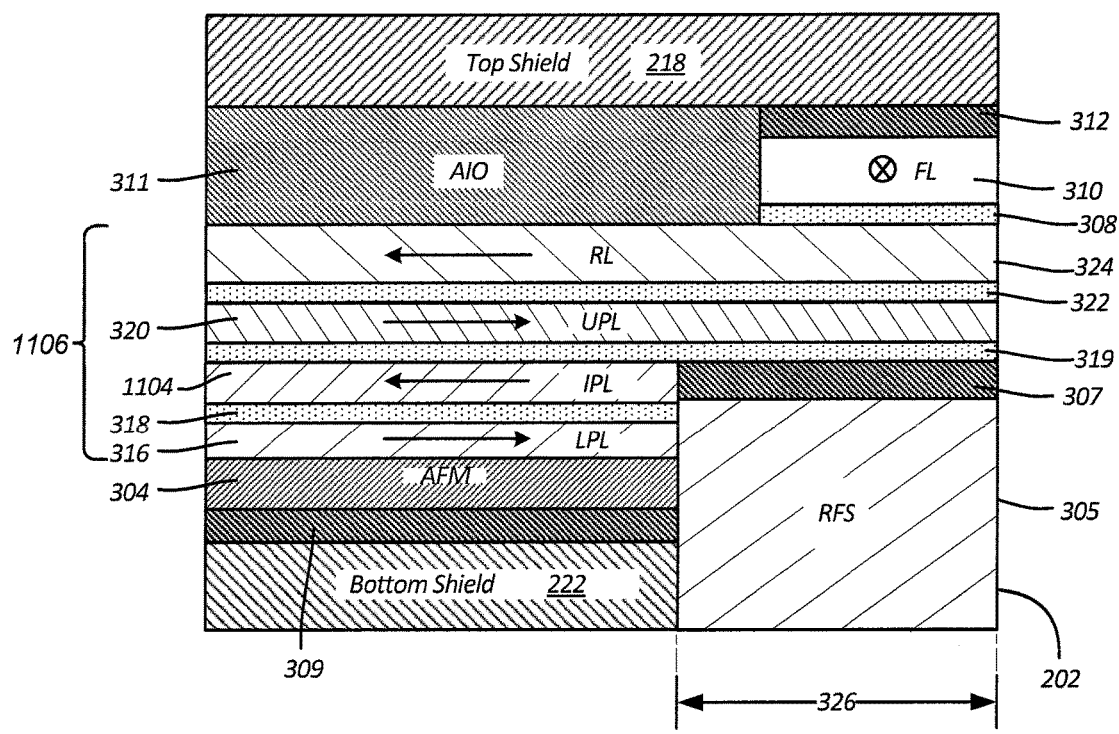
FIG. 11B is a sectional view of the magnetic reproducing device of FIG. 11A.

FIG. 11A is a bearing surface view of a magnetic reproducing device/reader 1100 that includes a magnetoresistive sensor 1102 that employs a recessed AFM layer to pin a ferromagnetic layer of a SAF structure of reader 1100. Recessed elements including recessed AFM layer 304 of reader 1100 are visible in FIG. 11B, which is a cross-sectional view of reader 1100 of FIG. 11A through a plane orthogonal to the bearing surface and layers of reader 1100 (along line C-C' shown in FIG. 11A). Like reader 700, to address magnetic instability, reader 1100 employs an additional ferromagnetic layer in the SAF structure 1106. However, in reader 1100 the entire additional ferromagnetic layer or intermediate ferromagnetic layer 1104, which constitutes the stabilization feature, is recessed from the bearing surface 202 such that layer 1104 is behind RFS 305. In other respects, reader 1100 is similar to reader 700. Thus, a description of the similar elements is not repeated.

Figure 12A:
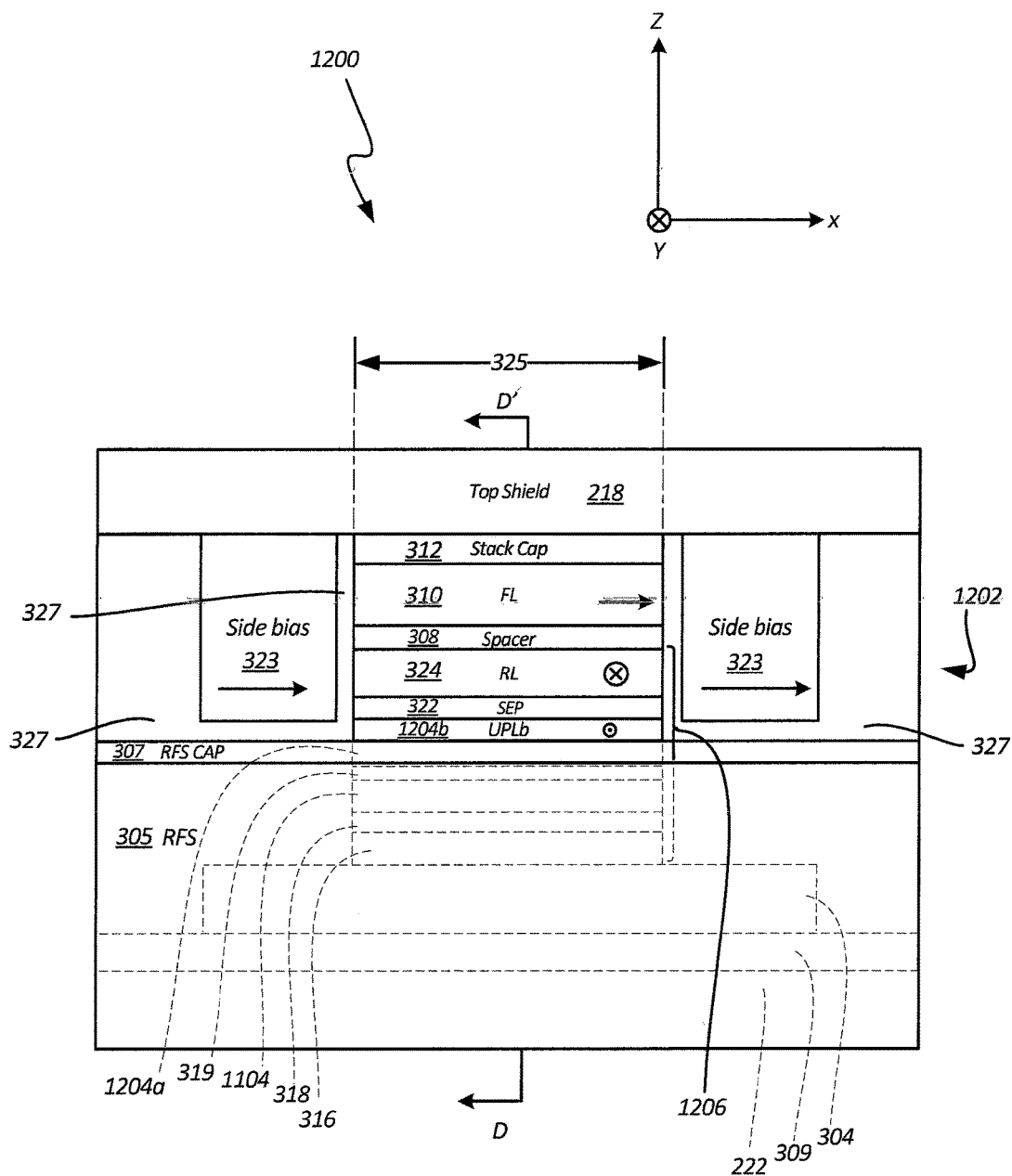
FIG. 12A is a bearing surface view of a fourth embodiment of a magnetic reproducing device.
Figure 12B:
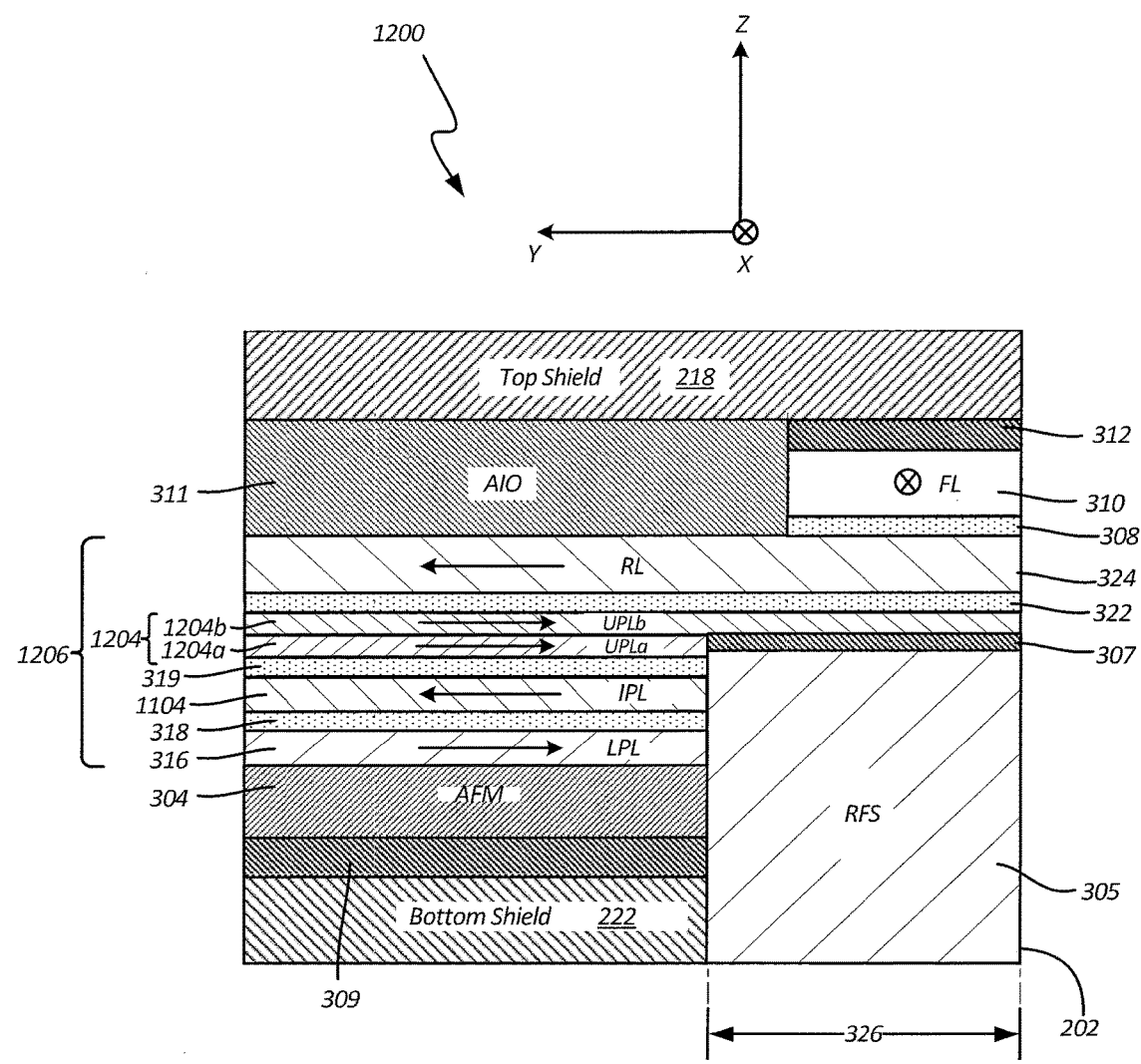
FIG. 12B is a sectional view of the magnetic reproducing device of FIG. 12A.

FIG. 12A is a bearing surface view of a magnetic reproducing device/reader 1200 that includes a magnetoresistive sensor 1202 that employs a recessed AFM layer to pin a ferromagnetic layer of a SAF structure of reader 1200. Recessed elements including recessed AFM layer 304 of reader 1200 are visible in FIG. 12B, which is a cross-sectional view of reader 1200 of FIG. 12A through a plane orthogonal to the bearing surface and layers of reader 1200 (along line D-D' shown in FIG. 12A). Like reader 1100, to address magnetic instability, reader 1200 employs an additional ferromagnetic layer in the SAF structure, with the entire additional ferromagnetic layer or intermediate ferromagnetic layer 1104 being recessed. Additionally, in reader 1200, upper pinned layer 1204 is a bi-layered structure including a lower recessed layer/portion 1204a and an upper non-recessed layer/portion 1204b. Lower recessed layer 1204a and upper non-recessed layer 1204b are ferromagnetically coupled, while the remailing magnetic layers in SAF structure 1206 are antiferromagnetically coupled. In other respects, reader 1200 is similar to readers 1100 and 700. Thus, a description of the similar elements is not repeated. It should be noted that, in some embodiments, upper pinned layer 1204 may include only a single film with no portion of the single film being recessed from the bearing surface.

One fabrication method for forming reader 1200 may include depositing layers 222, 309, 304, 316, 318, 1104, 319 and 1204a before patterning and depositing RFS 305. After RFS 305 is deposited, layer 1204a is milled to remove any contamination. Thereafter, layer 1204b is deposited on layer 1204a, which is substantially free of contaminants, to provide suitable exchange coupling between those layers.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A read sensor comprising:
   a bearing surface;
   an antiferromagnetic (AFM) layer recessed from the bearing surface;
   a synthetic antiferromagnetic structure (SAF) over the AFM layer, the SAF structure comprising:
      a lower pinned layer on the AFM layer;
      an upper pinned layer over the lower pinned layer, wherein the lower pinned layer and the upper pinned layer are antiferromagnetically coupled with a first energy density; and
      a reference layer over the upper pinned layer, wherein the upper pinned layer and the reference layer are antiferromagnetically coupled with a second energy density that is less than the first energy density.

2. The read sensor of claim 1 and wherein a magnitude of the first energy density is about 0.8 erg/cm$^2$ and a magnitude of the second energy density is about −0.3 erg/cm$^2$.

3. The read sensor of claim 1 and further comprising a lower non-magnetic separation layer between the lower pinned layer and the upper pinned layer and an upper non-magnetic separation layer between the upper pinned layer and the reference layer.

4. The read sensor of claim 3 and wherein the lower non-magnetic separation layer is about 0.84 nanometers (nm) thick and the upper non-magnetic separation layer is about 0.25 nm thick.

5. The read sensor of claim 3 and wherein both the lower non-magnetic separation layer and the upper non-magnetic separation layer comprise ruthenium.

6. A read sensor comprising:
   a bearing surface;
   an antiferromagnetic (AFM) layer recessed from the bearing surface;
   a synthetic antiferromagnetic (SAF) structure over the AFM layer, the SAF structure comprising:
      a lower pinned layer on the AFM layer, recessed together with the AFM layer;
      an upper pinned layer above the lower pinned layer;
      a reference non-recessed layer above the upper pinned layer; and
      a stabilization feature comprising:
         an intermediate pinned layer between the lower pinned layer and the upper pinned layer, wherein the intermediate pinned layer is antiferromagnetically coupled to both the lower pinned layer and the upper pinned layer, and wherein at least a portion of the intermediate pinned layer is recessed behind the bearing surface.

7. The read sensor of claim 6 and wherein the intermediate pinned layer is a bi-layered structure comprising a lower recessed layer that is recessed from the bearing surface and an upper non-recessed layer that comprises an end that is flush with the bearing surface.

8. The read sensor of claim 7 and wherein the lower recessed layer and the upper non-recessed layer of the bi-layered structure are ferromagnetically coupled.

9. The read sensor of claim 8 and wherein the upper pinned layer is a bi-layered structure comprising a lower recessed layer that is recessed from the bearing surface and an upper non-recessed layer that comprises an end that is flush with the bearing surface.

10. The read sensor of claim 9 and wherein the lower recessed layer and the upper non-recessed layer of the bi-layered structure are ferromagnetically coupled.

11. A read sensor comprising:
    a bearing surface;
    an antiferromagnetic layer recessed from the bearing surface;

a synthetic antiferromagnetic (SAF) structure over the antiferromagnetic layer, the SAF structure comprising:
an upper pinned layer;
at least one other pinned layer below the upper pinned layer, wherein the at least one other pinned layer and the upper pinned layer are antiferromagnetically coupled with a first energy density; and
a reference layer over the upper pinned layer, wherein the upper pinned layer and the reference layer are antiferromagnetically coupled with a second energy density that is less than the first energy density.

12. The read sensor of claim 11 and wherein the at least one other pinned layer comprises only a lower pinned layer that is recessed from the bearing surface.

13. The read sensor of claim 11 and wherein the at least one other pinned layer comprises a lower pinned layer recessed from the bearing surface and an intermediate pinned layer between the lower pinned layer and the upper pinned layer, and wherein at least a portion of the intermediate pinned layer is recessed behind the bearing surface.

14. The read sensor of claim 13 and wherein the intermediate pinned layer is a bi-layered structure comprising a lower recessed layer that is recessed from the bearing surface and an upper non-recessed layer that comprises an end that is flush with the bearing surface.

15. The read sensor of claim 14 and wherein the lower recessed layer of the bi-layered structure and the upper non-recessed layer of the bi-layered structure are ferromagnetically coupled.

16. The read sensor of claim 11 and wherein the at least one other pinned layer comprises a lower pinned layer recessed from the bearing surface and an intermediate pinned layer between the lower pinned layer and the upper pinned layer, and wherein the upper pinned layer, which is antiferromagnetically coupled to the intermediate pinned layer and the reference layer, is a single film with no portion of the single film being recessed from the bearing surface.

* * * * *